US009992183B2

United States Patent
Engelhart

(10) Patent No.: US 9,992,183 B2
(45) Date of Patent: Jun. 5, 2018

(54) USING AN IP MULTIMEDIA SUBSYSTEM FOR HTTP SESSION AUTHENTICATION

(71) Applicant: T-Mobile USA, Inc., Bellevue, WA (US)

(72) Inventor: Robert L. Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 14/051,448

(22) Filed: Oct. 11, 2013

(65) Prior Publication Data

US 2014/0282990 A1 Sep. 18, 2014

Related U.S. Application Data

(60) Provisional application No. 61/801,308, filed on Mar. 15, 2013.

(51) Int. Cl.
*G06F 7/04* (2006.01)
*H04L 29/06* (2006.01)
*H04L 29/08* (2006.01)

(52) U.S. Cl.
CPC .......... *H04L 63/08* (2013.01); *H04L 63/0807* (2013.01); *H04L 67/02* (2013.01); *H04L 67/141* (2013.01)

(58) Field of Classification Search
CPC . H04L 63/0807; H04L 65/1016; H04W 12/06
See application file for complete search history.

(56) References Cited

U.S. PATENT DOCUMENTS

| | | | |
|---|---|---|---|
| 8,844,011 B2* | 9/2014 | Przybysz | H04L 63/062 713/155 |
| 9,143,482 B1* | 9/2015 | Breau | H04L 63/0807 |
| 2003/0005280 A1* | 1/2003 | Bobde et al. | 713/150 |
| 2004/0153667 A1* | 8/2004 | Kastelewicz et al. | 713/201 |
| 2004/0225878 A1* | 11/2004 | Costa-Requena | H04L 63/08 713/150 |
| 2005/0090256 A1* | 4/2005 | Dutta | H04B 7/18545 455/435.2 |
| 2008/0086771 A1* | 4/2008 | Li | H04L 9/3234 726/20 |
| 2008/0148351 A1* | 6/2008 | Bhatia | G06F 21/6218 726/2 |
| 2008/0155659 A1* | 6/2008 | Gazier | H04L 63/08 726/4 |
| 2009/0061820 A1* | 3/2009 | Patel et al. | 455/411 |

(Continued)

Primary Examiner — Techane Gergiso
(74) Attorney, Agent, or Firm — Perkins Coie LLP

(57) ABSTRACT

Disclosed is a method and system for utilizing an Internet Protocol Multimedia Subsystem (IMS) to authenticate an HTTP session between a communication device and an online application program. The method includes registering a communication device on an IMS, and generating an authorization token which is sent to the communication device. The communication device then embeds the authorization token in HTTP request communication directed to the IMS. The IMS, after verifying the authorization token, forwards the HTTP request and token to a selected Web server that hosts an online application to authenticate an HTTP session.

20 Claims, 3 Drawing Sheets

(56) References Cited

U.S. PATENT DOCUMENTS

| | | | |
|---|---|---|---|
| 2009/0064284 A1* | 3/2009 | Poston | G06F 21/6218 |
| | | | 726/4 |
| 2009/0119182 A1* | 5/2009 | Krstulich | G06F 21/42 |
| | | | 705/26.1 |
| 2010/0138905 A1* | 6/2010 | Kass | G06F 21/33 |
| | | | 726/7 |
| 2010/0263032 A1* | 10/2010 | Bhuyan | H04L 63/061 |
| | | | 726/7 |
| 2011/0256849 A1* | 10/2011 | Dutta | H04B 7/18545 |
| | | | 455/411 |
| 2012/0023490 A1* | 1/2012 | Goebl | G06F 21/10 |
| | | | 717/173 |
| 2012/0042371 A1* | 2/2012 | Gur | G06F 21/33 |
| | | | 726/9 |
| 2012/0191976 A1* | 7/2012 | Blot-Lefevre | H04L 63/12 |
| | | | 713/168 |
| 2013/0024688 A1* | 1/2013 | Wen | H04L 63/0807 |
| | | | 713/168 |
| 2013/0081123 A1* | 3/2013 | Przybysz et al. | 726/7 |
| 2013/0139241 A1* | 5/2013 | Leeder | H04W 12/06 |
| | | | 726/9 |

* cited by examiner

USING AN IP MULTIMEDIA SUBSYSTEM FOR HTTP SESSION AUTHENTICATION

CROSS-REFERENCE TO RELATED APPLICATION

This application claims the benefit of U.S. Provisional Application No. 61/801,308, entitled "USING AN IP MULTIMEDIA SUBSYSTEM FOR HTTP SESSION AUTHENTICATION," filed Mar. 15, 2013.

BACKGROUND

An IP Multimedia Subsystem (IMS) enables the controlled delivery of a variety of application services across a private network that supports the Internet Protocol (IP). For example, the IMS can allow a wireless service subscriber to perform voice calls on a wireless device supporting IP network connectivity, using a Voice Over IP (VOIP) protocol. This enables the wireless device to support voice calls even if the device lacks support for circuit-switching protocols traditionally required for voice calls. In the IMS paradigm, several application services (which may include VOIP, whiteboard discussions, video conferencing, push-to-talk over cellular (POC), real-time content sharing for video/audio files, instant messaging, and interactive gaming among other things) may be combined into a single SIP-based session.

Most access to online application programs from a mobile device is authenticated by some sort of login protocol. The most common login protocol requires that the user enter their user name and a password. However this technique has drawbacks. First, the user must often be required to remember a host of passwords for different application programs. In addition, user names and passwords are often hacked or stolen, thereby placing the user's data or financial security at risk. Given these problems and others, there is a need for an improved technique for providing access to online application programs from a mobile device.

DETAILED DESCRIPTION

As will be described in detail below, the disclosed technology relates to a method and system that authenticates an online session with an application program by using a mobile device's registration with an Internet Protocol Multimedia Subsystem (IMS) as a proxy or substitute for a user having to login to the online application with a user name/password or other technique. A communications device user, who is a subscriber on the IMS, registers with the IMS. After a successful registration, an application included on the device by the IMS provider sends a SIP invite message through the IMS to the SG requesting an authorization token. A services gateway in the IMS verifies the user's registration with the IMS and generates an authorization token for the user. The token is sent to the user's communications device using an encrypted Session Initiation Protocol (SIP). When the user wants to access an online application program, a program or browser running on the communication device generates an HTTP or HTTPS request to a services gateway (SG) on the IMS. (Note that where "HTTP" is used herein, the system may also represent secure HTTP communications using encryption or HTTPS.) The request includes the token. The presence of the token serves to validate the user such that the request can be sent to a server hosting the desired application program in order to authenticate the session. In one embodiment, the token is securely stored on the communication device such as on a secure ISIM card. The token may have a limited lifetime (e.g. 24 hours) so that when it expires, the user will have to obtain a new or renewed token from the IMS before being allowed to access online programs through the IMS.

Various embodiments of the disclosed technology will now be described. The following description provides specific details for a thorough understanding and an enabling description of these embodiments. One skilled in the art will understand, however, that the disclosed technology may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the technology.

Figure 1:
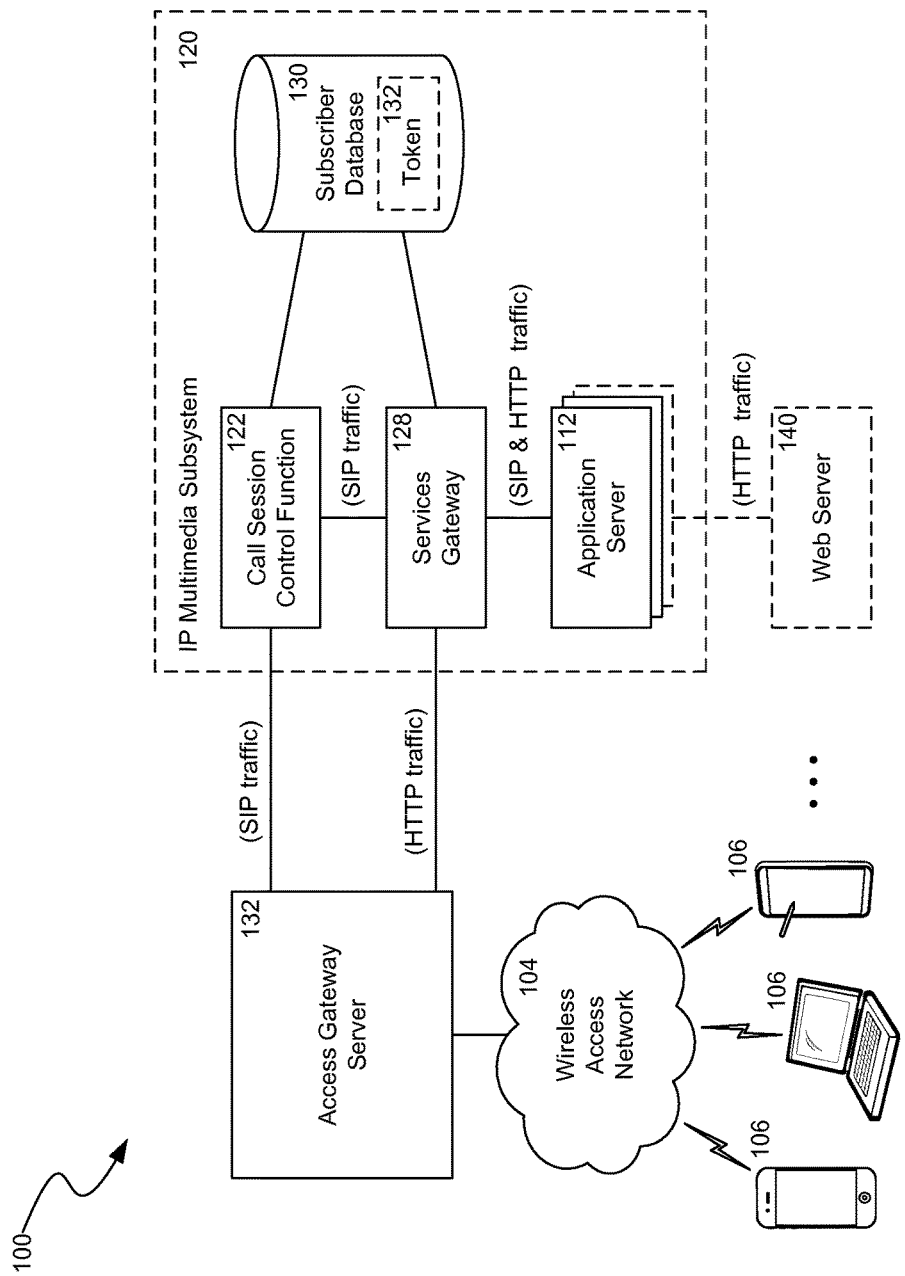
FIG. 1 is a block diagram of an exemplary system in which an IP Multimedia Subsystem (IMS) can be utilized to control access to an online application program in accordance with an embodiment of the disclosed technology.

FIG. 1 is a block diagram that illustrates an exemplary system 100 in which an IP Multimedia Subsystem (IMS) 120 can be utilized to control access to online application programs from a communication device in accordance with an embodiment of the disclosed technology. A communications device 106, such a mobile phone, tablet computer, laptop, PDA or the like, is connected via a wireless access network 104, to an access gateway server 132. In some embodiments, a large number of communications devices 106 may be supported on the wireless access network 104.

The connection across the wireless access network 104 is Internet Protocol (IP)-based, permitting the delivery of Session Initiation Protocol network traffic as well as HTTP network traffic. The access gateway server 132 is connected to an IP Multimedia Subsystem 120. SIP traffic flows between the access gateway server 132 and one or more Call Session Control Function servers 122, which are located within the IMS 120. Additional details of the IMS 120, including the Call Session Control Function servers 122, may be found in the Applicant's co-pending U.S. patent application Ser. No. 13/329,163, entitled "System and Method for Non-IMS Application Service Access Over IP Multimedia Subsystem", the content of which is herein incorporated by reference in its entirety. Various details are illustrated in a simplified manner herein for the sake of brevity; although a person having ordinary skill in the art will understand the details necessary for an implementation of the disclosed technology without undue experimentation.

The Call Session Control Function servers 122 are communicatively coupled with a subscriber database 130, which may be utilized during the IMS registration process for registering users and their communication devices with the IMS 120. Registration with the IMS may include verifying the user's identity (IMS network authentication), recording a device ID for their communication device(s) and checking the user's payment history. In addition, the subscriber database 130 may keep track of a list of online applications that the user is allowed to access or that the user is not allowed to access.

In accordance with an embodiment of the disclosed technology, after a communication device seeking to access an online application has been verified against the subscriber database, an application on the device requests a token from the services gateway 128. The services gateway generates a token 132 for a registered user for authenticating an HTTP session with an online application. Since the CSCF allowed the query from the device to the services gateway, it is implicitly understood that the subscriber's identity has been authenticated through the normal IMS registration procedures. The CSCF is indicated as a trusted node in the services gateway access control list. Although not illustrated for the sake of brevity, the system 120 may store and manage a large number of tokens and registered users simultaneously. The services gateway 128 sends the generated 132 token to the communications device 106 of the user, preferably using a secured communication technique. The communications device 106 then may establish an HTTP session with a Web server 140 on the internet by sending an HTTP request to the services gateway 128 that includes the token. Such an HTTP request can be generated by a program provided by the IMS that inserts the token into the request. Alternatively, a browser program on the user's communication device 106 can be programmed or modified to include the token in the HTTP request. When the services gateway 128 receives the request, it checks for a valid token and if present, forwards the HTTP request and token to the appropriate server 140 that hosts the desired online application program. The server for the desired application program recognizes the token and knows the identity of the user based on information in the token in order to authenticate the session.

In another embodiment, the services gateway may store a local copy of tokens that are provided to users. Upon authenticating a token by checking a received token against the copy 132 that is stored locally in the IMS 120, the services gateway 128 may then permit the HTTP request to be sent to the appropriate Web server.

In yet another embodiment, if an HTTP request is received from a communication device 106 that does not include a token, the Call Session Control Function server 122 may request that the communication device send the token in a manner similar to a cookie.

Figure 2:
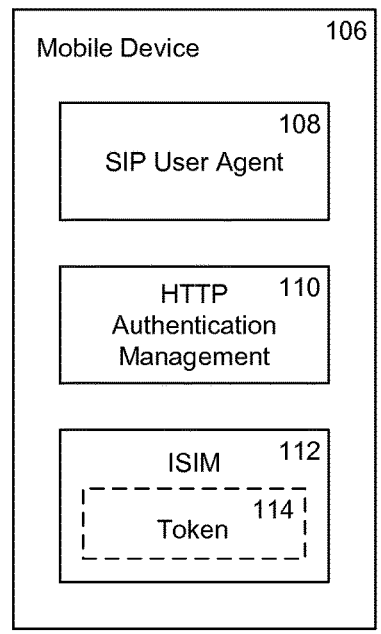
FIG. 2 is a block diagram that illustrates additional details of a mobile device used in the system of FIG. 1.

FIG. 2 is a block diagram that illustrates additional details of a mobile device 106 used in the system 100. The mobile device 106 includes an SIP user agent 108, an HTTP authentication management component 110, and an IP Multimedia Services Identity Module (ISIM) 112.

The SIP user agent 108 exchanges SIP traffic with the Call Session Control Function server 122 to register the mobile device 106 with the IMS 120. The ISIM 112 is generally used by the SIP user agent 108 for registering the mobile device 106 with the IMS 120.

The HTTP authentication management component 110 exchanges HTTP traffic with the services gateway 128, which after being authenticated by the services gateway 128 may be forwarded to a Web server 140. Accordingly, the services gateway 128 may control the flow of HTTP traffic being exchanged between a mobile device 106 and the Web server 140

A token 114 for authenticating HTTP messages from a mobile device 106 may be stored in a secure location, such as within the ISIM 112. When the HTTP authentication management component 110, which may be part of an application program or the browser operating on the mobile device, sends an HTTP request to the services gateway 128 that includes the token, it will ideally be sent in a secured format (e.g., Secure HTTP or HTTPS), to prevent third parties (e.g., other listeners on the wireless access network 104) from obtaining and using a copy of the token 114. As an additional security measure, the token may have an expiration timer in some embodiments, which will be discussed in additional detail below.

Figure 3:
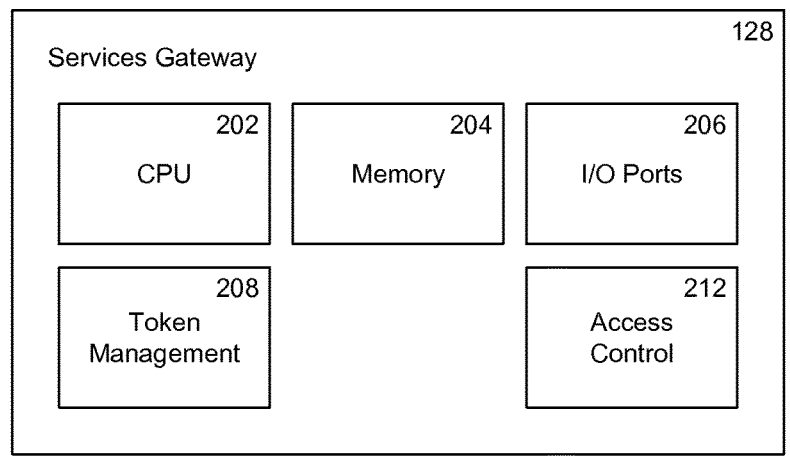
FIG. 3 is a block diagraph that illustrates additional details of a services gateway of the system of FIG. 1.

FIG. 3 is a block diagraph that illustrates additional details of the services gateway 128 of the system 100. The services gateway includes a memory 204, input/output ports 206, and a processor 202 that is programmed to provide a token management component 208 and an access control component 212.

The input/output ports 206 illustrated for the services gateway 128 generally will support both HTTP network traffic (e.g., directly with the access gateway server 132), as well as SIP network traffic (e.g., via the call session control function 122). Supported standardized input/output ports 206 may include: port 80 or port 8080 (for non-secured HTTP traffic), port 443 (for secured HTTP traffic), port 5060 (for non-secured SIP traffic), and/or port 5061 (for secured SIP network traffic). In other embodiments, various other alternate or additional ports may be supported, including various other possible non-standardized HTTP and/or SIP ports, or future standardized HTTP and/or SIP ports.

The token management component 208 generates a token after verifying that a mobile communication device is properly registered with the IMS. The token management component 208 sends the generated token to the mobile device 106 and may optionally store a copy of the generated token 132 locally such as in the subscriber database 130.

When a token is expiring, the token management component 208 may take appropriate measures, such as generating a new replacement token, sending the replacement token to the mobile device 106, and overwriting the token 132 in the subscriber database 130 with the replacement token. In one embodiment, the user may be prompted to reconfirm their registration with the IMS before the new token is generated.

The access control component 212 is configured to determine when a token received from a mobile device 106 is valid before permitting the HTTP traffic to be passed to the Web server 140. The access control component 212 may perform one or more checks to determine if the token is valid. For example, the access control component 212 may check to see if the token in the request has expired. If the token has not expired, the HTTP traffic is passed to the web server. If the token has expired, the HTTP traffic is not passed to the web server. As another example, the access control component 212 may determine whether the token received in an HTTP request from the communication device 106 matches the stored token 132 in the subscriber database 130. If the token received in the HTTP request matches the stored token, the received token is valid and the HTTP traffic is passed to the Web server. As another example, the access control component 212 may check an access control list that is associated with the token. An access control list may be used to ensure that only certain registered users to access certain applications servers 125 or Web servers 140. The access control list is a list of authorized (or conversely, inhibited) applications that the user is allowed (or denied) access to. Even though a user may be registered in the IMS, access control component 212 may deny the user access the Web server 140 if they are not explicitly allowed to by the access control list. The access control list may be stored within the subscriber database 130 or alternately, in the services gateway 128. As yet another example, the access control component 212 may determine whether the user has exceeded any subscription settings associated with the user's account. For example, the access control component may not allow a user to transmit HTTP traffic via the IMS if the user hasn't paid a bill, if the user has exceeded an allowed time period, if the user has failed to subscribe to an extra required service, if the user is prevented by parental controls, or so on.

Figure 4:
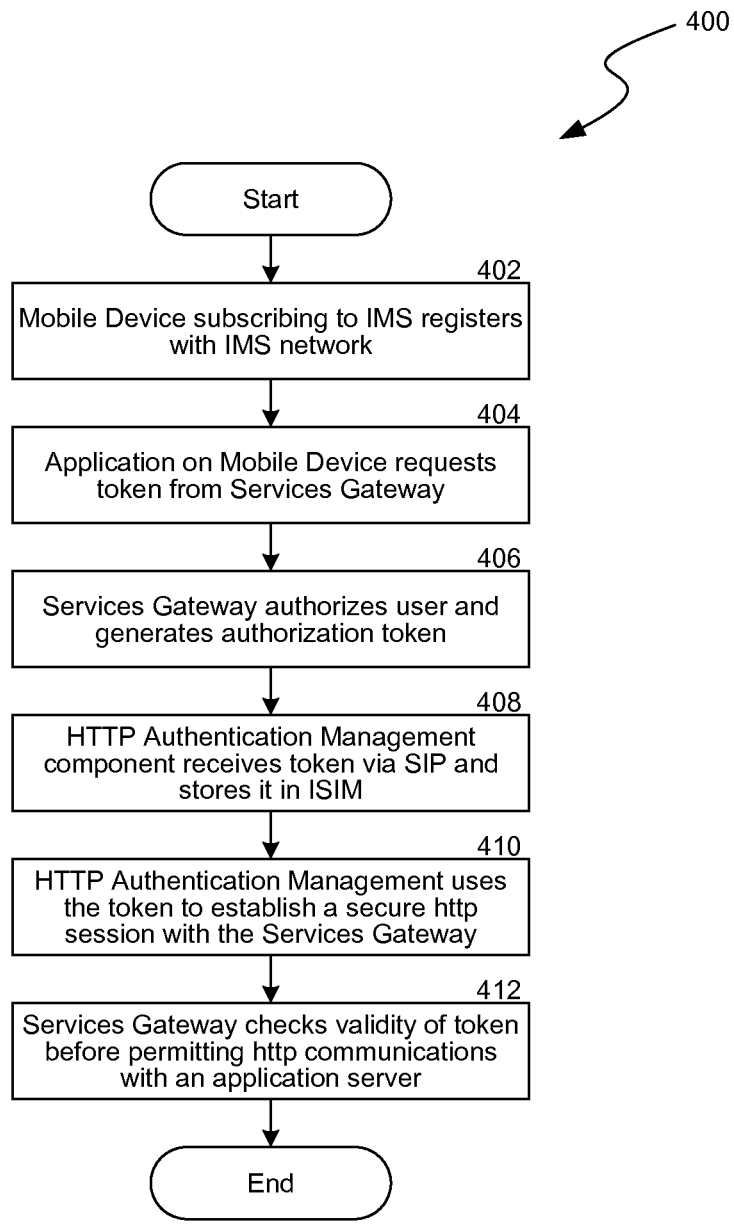
FIG. 4 is a flow chart that illustrates an example process for using an IMS to authenticate a session with an online application program from a mobile device in accordance with an embodiment of the disclosed technology.

FIG. 4 is a flow chart that illustrates an exemplary process 400 for using an IMS to authenticate an online session between a communication device and an online application in accordance with an embodiment of the disclosed technology.

The process 400 begins at block 402, where a communication device 106 subscribing to the IMS 120 registers with the IMS network. For example, this may include the SIP user agent 108 of the mobile device exchanging SIP traffic to the Call Session Control Function 122. The Call Session Control Function 122 may check whether the user's account is active in the subscriber database 130.

The process 400 then continues to block 404, where the HTTP authentication management component 110 in the communication device 106 requests an authorization token from the IMS 120. For example, if a communication device application attempts to communicate via HTTP with an internet Web server 140, the HTTP authentication management component 110 may determine that a token 114 is not yet present in the ISIM 112. The HTTP authentication management component 110 or other carrier provided application may send the services gateway 128 a secure SIP message (via the call session control function 122) requesting a token.

Proceeding to 406, the access control component 212 of the services gateway authorizes the user and generates a token for HTTP communications for the user. As previously described, the token 132 may be stored in the subscriber database 130 for future reference, and securely delivered (e.g., by SIP message) to the HTTP or other authentication management component 110 on the device.

Proceeding to block 408, the HTTP authentication management component 110 then may store the received token securely, such as within the ISIM 114.

Proceeding to block 410, after an application (or the operating system) on the communication device 106 requests to create an HTTP communication session with a Web server 140, the HTTP authentication management component 110 retrieves the token 114 from the ISIM and embeds it in a secure HTTP request to the services gateway 128. How the token is referenced in the HTTP request is up to the operator, e.g. it could be indicated by a special header or embedded in the payload data.

Proceeding to block 412, the services gateway 128 checks for the presence of the token and may optionally compare the received token with a copy of the token that is stored locally in order to determine the validity of the token before permitting HTTP communications with an application server 125 (and/or with one or more Web servers, such as with the Web server 140). In some embodiments, there may be one or more particular application servers 125 assigned for this type of external, direct HTTP communication.

In an alternate embodiment, HTTP traffic including the token may be permitted to be sent directly from the user's communication device to an application server. The application server may then query the services gateway (or perform similar functions) in order to validate the user as being authorized to send HTTP traffic across the IMS 120.

As described herein, the token is analogous to a certificate for public key encryption.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for operating a processor in an Internet Protocol Multimedia Subsystem (IMS) to authenticate a Hypertext Transfer Protocol (HTTP) session between a communication device and an online application, the method comprising:
    receiving a request from a communication device to initiate an HTTP session with an online application that is hosted by a Web server on a public network;
    determining whether the communication device is registered on the Internet Protocol Multimedia Subsystem, wherein the Internet Protocol Multimedia Subsystem and the Web server are operated by different network organizations;
    in response to determining that the communication device is registered on the Internet Protocol Multimedia Subsystem:
        generating an initial authentication token,
            wherein the generating is performed in the Internet Protocol Multimedia Subsystem; and
        sending the generated initial authentication token to the communication device,
            wherein the initial authentication token is sent prior to receiving an HTTP session request from the communication device;
    receiving an HTTP session request from the communication device;
    determining whether the received HTTP session request includes a copy of the authentication token;
    in response to determining that the received HTTP session request does not include a copy of the authentication token,
        requesting a copy of the authentication token, and
        receiving the copy of the authentication token in response to the request;
    determining whether the copy of the authentication token is valid; and
        in response to determining that the authentication token is valid, transmitting the HTTP session request and the authentication token to the Web server to authenticate the communication device to the online application hosted by the Web server without an additional login from the communication device.

2. The method of claim 1, wherein the HTTP session request is received from the communication device using a Session Initiation Protocol (SIP).

3. The method of claim 1, further comprising:
    receiving an HTTP response from the Web server, the response being addressed to the communication device; and
    transmitting the received HTTP response to the communication device.

4. The method of claim 1, further comprising assigning an expiration time to the initial authentication token.

5. The method of claim 4, wherein determining whether the copy of the authentication token is valid comprises determining whether the assigned expiration time to the initial authentication token has expired.

6. The method of claim 1, further comprising storing a copy of the initial authentication token.

7. The method of claim 6, wherein determining whether the copy of the authentication token is valid comprises comparing the copy of the authentication token with the copy of the initial authentication token to confirm that the copy of the authentication token and the initial authentication token are the same.

8. The method of claim 1, wherein determining whether the copy of the authentication token is valid comprises comparing the copy of the authentication component to an access control list.

9. The method of claim 1, wherein determining whether the copy of the authentication token is valid comprises comparing the copy of the authentication component to subscriber settings associated with the communication device.

10. The method of claim 1, further comprising:
   determining whether the initial authentication token has expired; and
   in response to determining that the initial authentication token has expired:
      generating a new replacement token;
      assigning a new expiration time; and
      sending the new replacement token to the communication device.

11. At least one non-transitory computer-readable medium storing instructions, which when executed by at least one processor in an Internet Protocol Multimedia Subsystem (IMS), authenticates a Hypertext Transfer Protocol (HTTP) session between a communication device and an online application, comprising:
   receiving a request from a communication device to initiate an HTTP session with an online application that is hosted by a Web server on a public network;
   detecting whether a communication device is registered on the Internet Protocol Multimedia Subsystem, wherein the Internet Protocol Multimedia Subsystem and the Web server are operated by different network organizations;
   in response to determining that a communication device is registered on the Internet Protocol Multimedia Subsystem:
      generating an initial authentication token, wherein the initial authentication token is generated in the Internet Protocol Multimedia Subsystem; and
      causing the generated initial authentication token to be sent to the communication device,
         wherein the generated initial authentication token is sent to the communication device before an HTTP session request is received from the communication device;
   receiving an HTTP session request from the communication device;
   determining whether the received HTTP session request includes an authentication token;
   in response to determining that that the received HTTP session request does not include an authentication token, requesting an authentication token from the communication device;
   receiving a copy of the authentication token from the communication device;
   determining whether the copy of the authentication token is valid; and
   in response to determining that the copy of the authentication token is valid, causing the HTTP session request and authentication token to be sent to the Web server to authenticate the communication device to the online application hosted by the Web server without an additional login from the communication device.

12. The non-transitory computer-readable medium of claim 11, further comprising assigning an expiration time to the initial authentication token.

13. The non-transitory computer-readable medium of claim 12, wherein determining whether the copy of the authentication token is valid comprises determining whether the copy of the initial authentication token has expired.

14. The non-transitory computer-readable medium of claim 11, further comprising storing a copy of the initial authentication token.

15. The non-transitory computer-readable medium of claim 14, wherein determining whether the copy of the authentication token is valid comprises comparing the copy of the authentication token with the copy of the initial authentication token to confirm that the copy of the authentication token and the initial authentication token are the same.

16. The non-transitory computer-readable medium of claim 11, wherein determining whether the copy of the authentication token is valid comprises comparing the copy of the authentication component to an access control list.

17. The non-transitory computer-readable medium of claim 11, wherein determining whether the copy of the authentication token is valid comprises comparing the copy of the authentication component to subscriber settings associated with the communication device.

18. A communication device including a processor configured to execute program instructions to initiate a Hypertext Transfer Protocol (HTTP) session with an online application, comprising:
   a memory for securely storing a received token;
   a processor for executing a sequence of stored instructions in order to:
      register the communication device with an Internet Protocol Multimedia Subsystem;
      receive a token from the Internet Protocol Multimedia Subsystem, wherein the received token was generated in the Internet Protocol Multimedia Subsystem;
      store the received token in the memory,
         wherein the received token is stored in the memory before the creation of a request to establish an HTTP session with an online application program that is hosted by a Web server on a public network,
         wherein the Web server and the Internet Protocol Multimedia Subsystem are operated by different network organizations;
      create a request to establish an HTTP session with the online application program; and
   wherein the processor is for executing a sequence of stored instructions further in order to:
      (a) embed the stored token in the request to establish an HTTP session such that an HTTP session is authenticated with the application program without having to perform a log-in procedure with the application program; or (b) receive a request for the stored token in response to a determination that the request to establish an HTTP session does not include a copy of the token, and transmit the stored token in response to the received request for the stored token such that an HTTP session is authenticated with the application program without having to perform a log-in procedure with the application program.

19. The communication device of claim 18, wherein the token is stored in an IP Multimedia Services Identity Module (ISIM).

20. The communication device of claim 18, wherein the token has an expiration time.

* * * * *